United States Patent
Desprez et al.

(10) Patent No.: US 6,664,766 B2
(45) Date of Patent: Dec. 16, 2003

(54) SUPERCAPACITOR BALANCING METHOD AND SYSTEM

(75) Inventors: Philippe Desprez, Blanquefort (FR); Gérard Barrailh, Gradignan (FR); Damien Rochard, Poitiers (FR); Stéphane Raël, Nancy (FR); Fadi Sharif, Maizieres (FR); Bernard Davat, Nancy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/171,968

(22) Filed: Jun. 17, 2002

(65) Prior Publication Data

US 2003/0062876 A1 Apr. 3, 2003

(30) Foreign Application Priority Data

Jun. 18, 2001 (FR) ............................. 01 07959

(51) Int. Cl.[7] ............................................. H01M 10/44
(52) U.S. Cl. ...................... 320/167; 320/120; 320/122
(58) Field of Search ................. 320/167, 120, 320/122

(56) References Cited

U.S. PATENT DOCUMENTS

| | | | | |
|---|---|---|---|---|
| 3,732,490 A | * | 5/1973 | Botka | .................... 324/609 |
| 5,063,340 A | | 11/1991 | Kalenowsky | |
| 5,444,378 A | * | 8/1995 | Rogers | .................... 324/428 |
| 5,528,121 A | | 6/1996 | Okamura | |
| 5,545,933 A | | 8/1996 | Okamura et al. | |
| 5,726,552 A | | 3/1998 | Okamura | |
| 6,104,759 A | * | 8/2000 | Carkner et al. | ............. 375/295 |
| 6,496,394 B2 | * | 12/2002 | Hanaoka et al. | ............. 363/71 |

FOREIGN PATENT DOCUMENTS

EP          0 851 445 A2    7/1998

OTHER PUBLICATIONS

Bonert R et al.: "Super–capacitors for peak load shaving of batteries" EPE '97. 7th. European Conference on Power electronics and applications. Trondheim, Sep. 8–10, 1997, EPE. European Conference on Power Electronics and Applications, Brussels, EPE Association, B, vol. 1 conf. 7, Sep. 8, 1997, pp. 1055–1060.

* cited by examiner

Primary Examiner—Bao Q. Vu
(74) Attorney, Agent, or Firm—Sughrue Mion, PLLC

(57) ABSTRACT

The present invention relates to a supercapacitor balancing method including bypassing the current flowing in the supercapacitor from a predetermined threshold voltage at the terminals of the supercapacitor, the bypass current being a function of the voltage at the terminals of the supercapacitor and increasing continuously as a function of the voltage.

Figure 1:
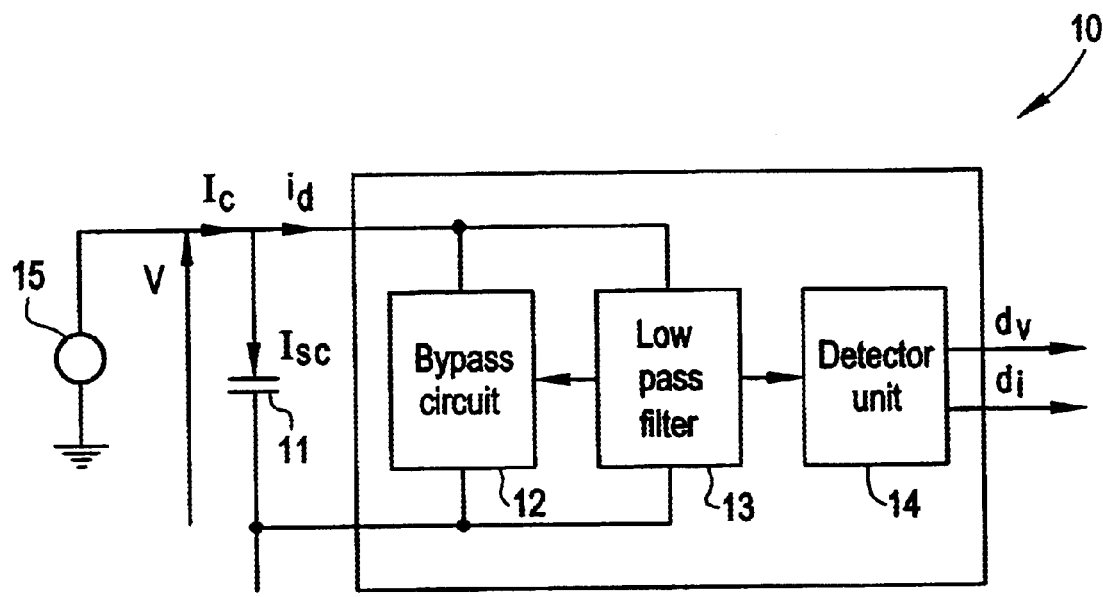

The method is characterized in that the bypass current increases between the threshold voltage, for which the bypass current constitutes a minimum bypass current, and a reference voltage, for which the bypass current constitutes a nominal bypass current, and in that the difference between the reference voltage and the threshold voltage is less than 200 mV and the ratio between the nominal bypass current and the minimum bypass current is greater than 100.

15 Claims, 5 Drawing Sheets

SUPERCAPACITOR BALANCING METHOD AND SYSTEM

The present invention relates to a method and a system for balancing one or more supercapacitors.

Supercapacitors are known in the art and are currently being developed as power sources in high-power applications such as engine starting, power top-up for hybrid vehicle motors, and uninterruptible power supplies. In applications like these, power supplies are needed that can be charged quickly and can perform a very large number of cycles, which is the case with supercapacitors, but not with traditional batteries.

Supercapacitors are capable of delivering very high specific powers over short time periods. The characteristic discharging (or charging) time of a supercapacitor is of the order of a few seconds to a few tens of seconds, during which time specific powers exceeding 1 kW/kg can be delivered. Individual supercapacitors have a capacitance from 1 F to approximately 3 500 F and a very low resistance, of less than 1 mΩ for components with the highest capacity.

When charging supercapacitors, it is important not to exceed a maximum voltage at the terminals of the supercapacitor. Controlling the charging of a supercapacitor so that charging is stopped if the voltage at the terminals reaches a predetermined value is known in the art. If the voltage exceeds this predetermined value, aging of the supercapacitor is accelerated, which reduces its autonomy and power.

A supercapacitor module generally comprises a plurality of supercapacitors connected in series. The applications mentioned above generally require voltages exceeding a few tens of volts, or even a few hundreds of volts. In this case, at the end of charging the supercapacitor module, a spread of the characteristics of the supercapacitors relative to each other is observed, and this applies in particular to the voltage at the terminals of the supercapacitors. This is due to a spread of the intrinsic properties (series resistance and capacitance) of each supercapacitor in the module, to aging of the supercapacitors, and possibly to a temperature gradient within the module, due to its environment. This leads to different leakage currents for each of the supercapacitors of the module and therefore to different end of charging voltages for each of the supercapacitors.

This problem compromises correct operation of the supercapacitor module. Some supercapacitors of the module may reach voltages exceeding their nominal charging voltage, which degrades their characteristics and leads to premature aging. Thus the module as a whole cannot function correctly.

To solve this problem, the document EP-0 851 445 proposes connecting a bypass circuit in parallel with the terminals of each supercapacitor of a module comprising a plurality of supercapacitors, the bypass circuit comprising in series a resistance and a zener diode whose characteristic is such that the current bypassed in the latter increases strongly, in accordance with the characteristics of the components, from a value slightly lower than the nominal voltage of each of the supercapacitors.

The general principle of supercapacitor balancing consists in bypassing some or all of the supercapacitor charging current in order to equate the end of charging voltage to a predetermined value.

The solution proposed in the above document is not entirely satisfactory, however. As soon as the voltage reaches a critical threshold, which is less than the nominal end of charging voltage of the supercapacitor, until it is balanced, the current in the supercapacitor becomes equal to the current in the bypass circuit at the nominal voltage of the supercapacitor. Accordingly, to ensure a leakage current in the bypass circuit less than the intrinsic leakage current of the components, the bypass current is very low, for example of the order of 10 mA for a supercapacitor having an intrinsic leakage current of the order of 1 mA, although the current needed to complete the charging of the supercapacitor is high, of the order of several tens of amperes. It therefore takes a long time to complete the charging of the supercapacitor, although supercapacitors are often intended to be charged with fast charge-discharge cycles.

Because a high holding current is necessary to keep the supercapacitors charged, using bypass circuits with a high leakage current also represents a penalty in terms of energy consumption and additional thermal dissipation.

When the bypass circuit is open circuit, its high leakage current discharges the supercapacitor into the bypass circuit, causing the supercapacitor voltage to decrease quickly.

An object of the present invention is therefore to develop a supercapacitor balancing method and system that significantly improve the dynamics of the end of charging and produce homogeneous characteristics in terms of the voltage at the terminals of the supercapacitors.

The remainder of the description refers to balancing in relation to a supercapacitor module and a supercapacitor in isolation, in which case it is more a question of monitoring the charging voltage of the supercapacitor.

The present invention proposes a supercapacitor balancing method including bypassing the current flowing in said supercapacitor from a predetermined threshold voltage at the terminals of said supercapacitor, the bypass current being a function of the voltage at the terminals of said supercapacitor and increasing continuously as a function of said voltage. In the method according to the invention said bypass current increases between said threshold voltage, for which said bypass current constitutes a minimum bypass current, and a reference voltage, for which said bypass current constitutes a nominal bypass current, and the difference between said reference voltage and said threshold voltage is less than 200 mV and the ratio between said nominal bypass current and said minimum bypass current is greater than 100.

Accordingly, thanks to the invention, the bypass current can reach high values, which ensures a higher charging current during the end of charging period and therefore a reduction in the duration of the end of charging period, combined with a supercapacitor leakage current which is of the same order of magnitude as its intrinsic leakage current. This is possible thanks to the method according to the invention which, unlike the prior art method, uses a bypass circuit with a sufficiently steep slope of the current-voltage characteristic, i.e. one in which the difference between the bypass current and the leakage current is sufficiently high over the bypass current range to ensure both a high bypass current and a low leakage current.

The increase in the bypass current as a function of the voltage at the terminals of the supercapacitor is advantageously linear, so that the reduction in the charging current (and the increase in the bypass current) is progressive.

It is even more advantageous if the bypass current is limited as a function of the voltage at the terminals of the supercapacitor. This preserves the integrity of the system if the voltage at the terminals of the supercapacitor significantly exceeds the reference voltage of the bypass circuit.

The invention can use a MOSFET, a bipolar transistor or an IGBT, for example, in the linear power amplifier of the bypass circuit in parallel with the terminals of the supercapacitor. The wide variety of components of this type that is available means that a component having the required characteristics in terms of nominal bypass current and power dissipation can be selected.

What is more, associating one of these components with a regulation system fixes the minimum voltage from which the bypass current increases and the maximum voltage from which the bypass current is limited to a constant value, as well as the value of this constant maximum current, in order to adapt it to the characteristics of the supercapacitor (maximum voltage at the terminals at the end of charging, charging current).

An additional advantage of using a MOSFET or a bipolar transistor is its very low leakage current (less than 1 $\mu$A).

In the simplest embodiment of the invention, the reference voltage is advantageously equal to the end of charging voltage of the supercapacitor.

In a more sophisticated embodiment, the threshold voltage can be equal to the end of charging voltage of the supercapacitor. This optimizes charging, using charging protocols described later.

Accordingly, one highly advantageous variant of the method according to the present invention further includes monitoring the charging current of the supercapacitor as a function of the voltage at the terminals of the supercapacitor by a voltage detector logic function adapted to change from an activated state to a deactivated state if the voltage at the terminals of the supercapacitor exceeds the reference voltage, with the result that the supercapacitor charging current is reduced, and then to return to the activated state if the voltage at the terminals of the supercapacitor falls below a minimum monitoring voltage.

Thanks to this control function, the supercapacitor is not overcharged and the charging current at low current is reduced, with the result that the overall charging time is optimized This makes it possible to use a charging protocol with two levels of current and in which the charging current can exceed the nominal bypass current, which means that the charging time can be optimized without damaging the supercapacitor This control function is obtained by means of the voltage detector function, which delivers in the form of a hysteresis signal, for example.

Another highly advantageous variant of the method according to the present invention includes monitoring the charging current of the supercapacitor as a function of the bypass current by a current detector logic function adapted to change from an activated state to a deactivated state if the bypass current exceeds the nominal bypass current, with the result that the charging current of the supercapacitor is then reduced, and then to return to the activated state if the bypass current falls below a minimum monitoring current. This also makes it possible to use a charging protocol with multiple current levels, and in which the charging current with multiple plateaus can exceed the nominal bypass current, as a result of which the charging time can be optimized without damaging the supercapacitor.

In particular, this allows the charging current to fall in a linear manner, combined with maintaining some bypass current.

The control function is again obtained by means of the current detector function which delivers a signal in the form of a hysteresis signal, for example.

In accordance with the invention, voltage control and current control can be combined. This makes it possible not to remain in the deactivated state when monitoring the voltage, even if the bypass current is substantially zero.

Finally, the invention also relates to a system for implementing the above method, in particular including a MOSFET, a bipolar transistor or an IGBT in the bypass circuit.

A supercapacitor module according to the invention can comprise a plurality of supercapacitors connected in series and a respective bypass circuit connected in parallel with the terminals of each of the supercapacitors or a single bypass circuit connected in parallel with the terminals of the set of supercapacitors.

A set of such modules can be connected in series and/or in parallel with a single bypass circuit connected to the terminals of the set.

Other features and advantages of the present invention will become apparent on reading the following description, which is given by way of illustrative and nonlimiting example.

Figure 2:
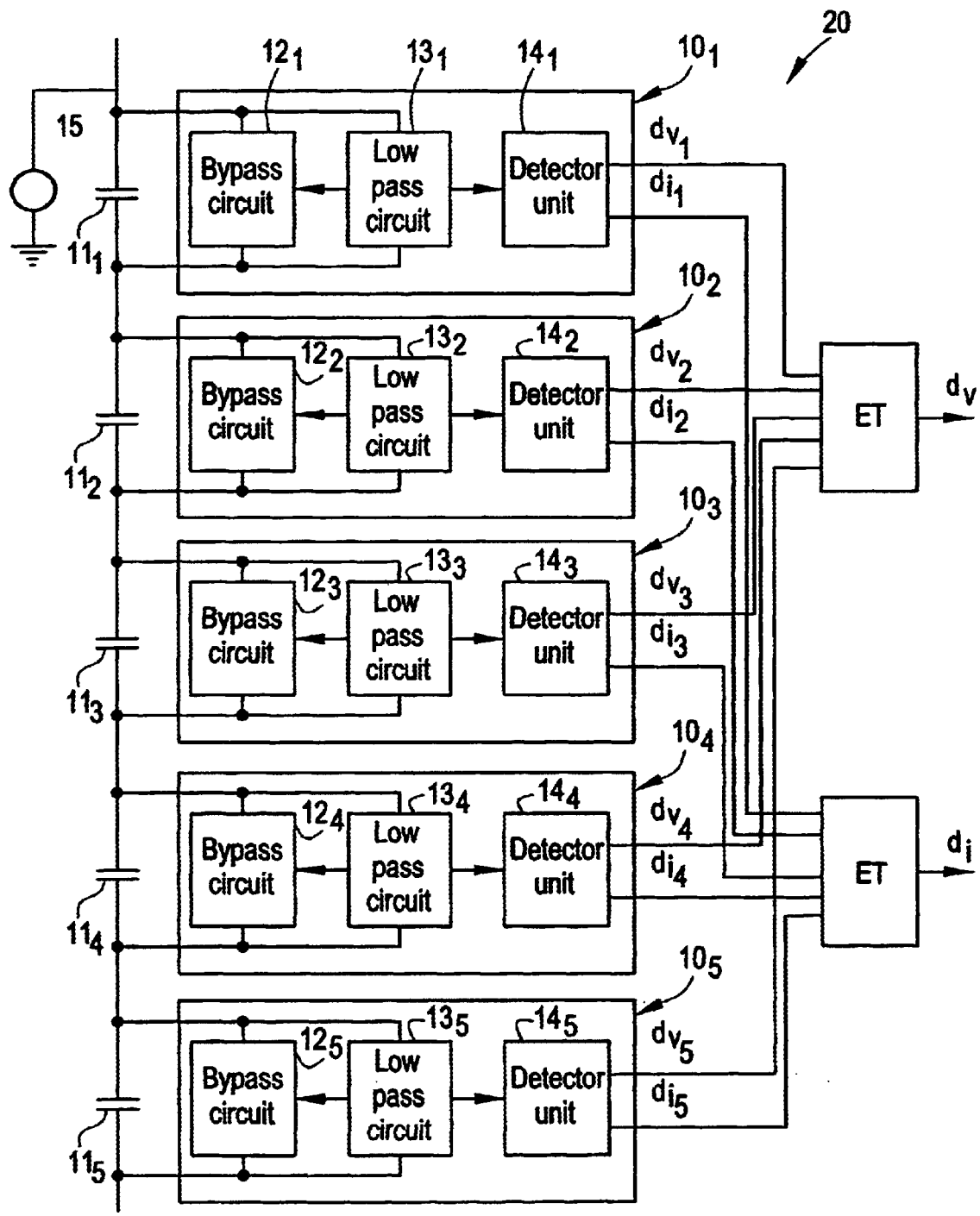

In the accompanying drawings:

FIG. 1 shows the theoretical diagram of a bypass circuit for implementing the method according to the invention on an individual supercapacitor FIG. 2 shows the theoretical circuit diagram of a balancing circuit in accordance with the invention for a module comprising a plurality of supercapacitors like that shown in FIG. 1

Figure 3:
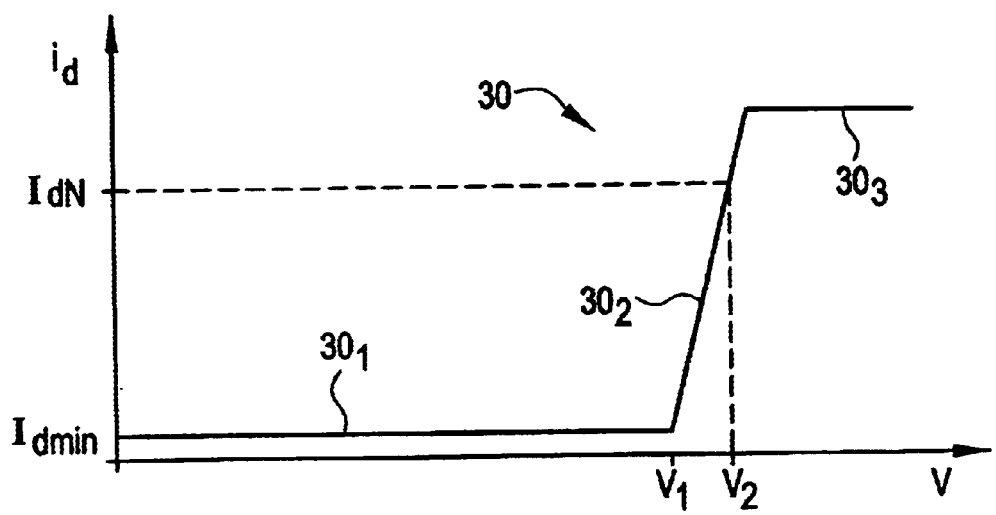
Figure 4:
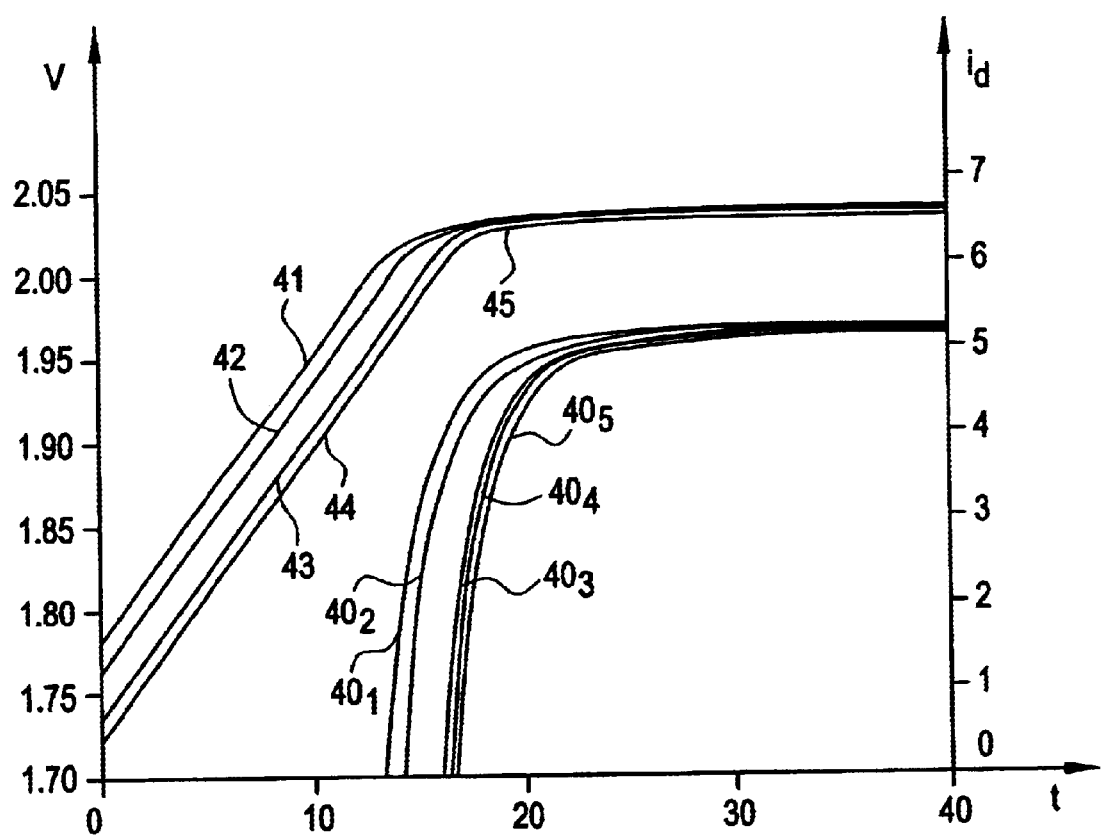
Figure 5:
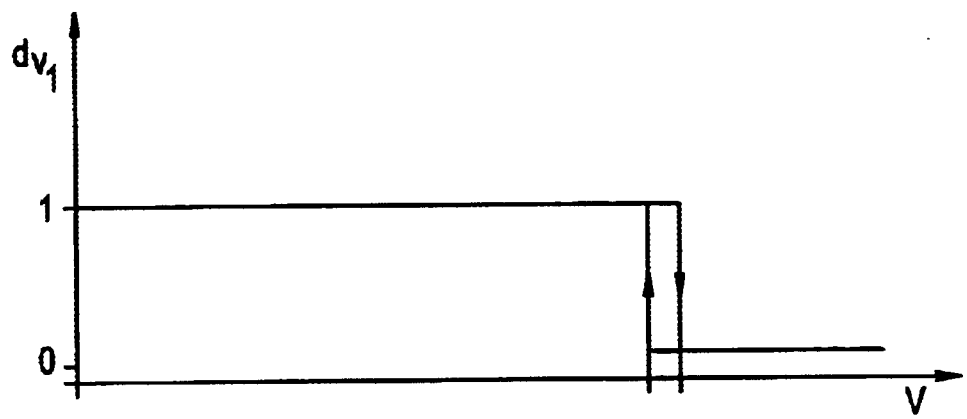
Figure 6:
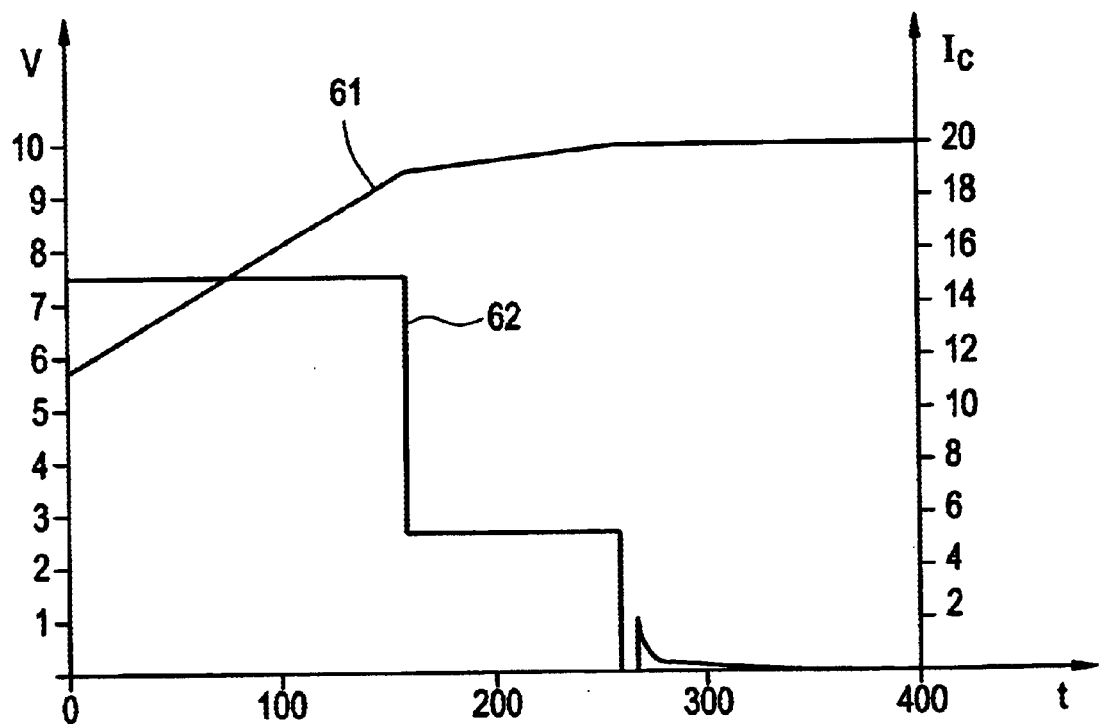
Figure 7:
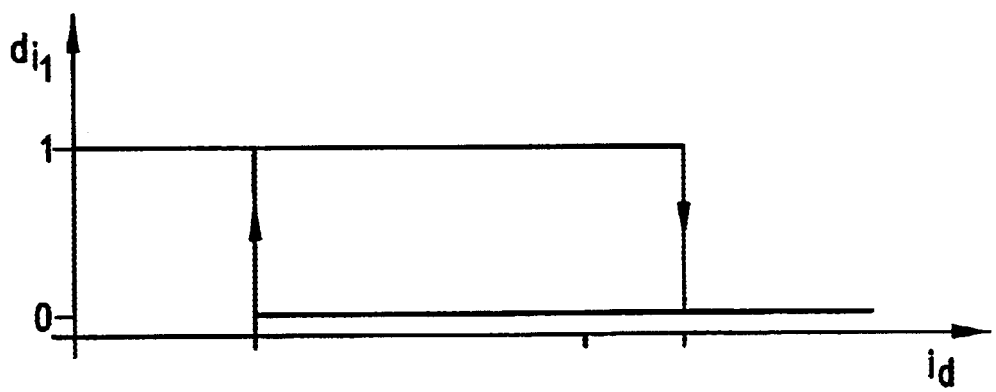
Figure 8:
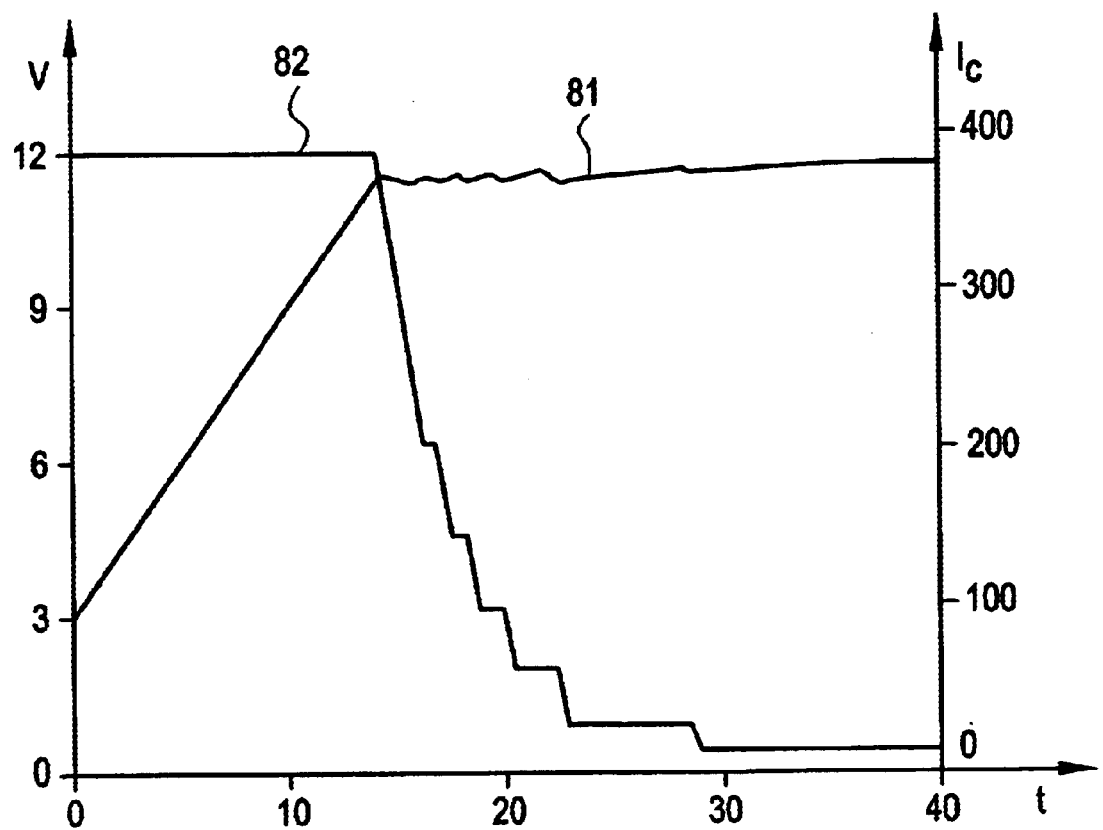

FIG. 3 shows one example of the characteristic curve of the bypass current of the method according to the invention as a function of the voltage at the terminals of a supercapacitor FIG. 4 shows the voltage at the terminals and the bypass current of the elements of a supercapacitor module balanced by means of a first embodiment of the invention FIG. 5 shows the hysteresis curve of the voltage detector function according to the invention FIG. 6 shows the voltage at the terminals and the charging current of a supercapacitor module balanced by means of a second embodiment of the invention FIG. 7 shows the hysteresis curve of the current detector function according to the invention FIG. 8 shows the voltage at the terminals and the charging current of a supercapacitor module balanced by means of a third embodiment of the invention.

In all the figures, common elements carry the same reference numbers.

FIG. 1 shows a circuit 10 according to the invention including a supercapacitor 11 whose terminals are connected in parallel with a bypass circuit 12 in accordance with the invention including a current-controlled power amplifier (not shown). A low-pass filter 13 is also connected in parallel with the terminals of the supercapacitor 11. The low-pass filter is necessary if high-frequency switching of the charging current $I_c$ generates voltage harmonics harmful to correct operation of the bypass circuit 12. Finally, a detector unit 14 connected to the filter 13 generates charging management logic signals $d_v$ and $d_i$ which are interpreted by the charger 15 of the supercapacitor 11 for safe and fast charging, as explained in more detail later.

FIG. 2 shows a supercapacitor module 20 comprising a plurality of circuits $10_1$ to $10_5$ like that from FIG. 1 (five such circuits in the FIG. 2 example). Each element of a circuit $10_n$ (n varying from 1 to 5 in the FIG. 2 example) includes the same elements as the circuit 10 from FIG. 1, with the same reference number having a suffix corresponding to the rank of the circuit in the module 20. The charger 15 is common to all the supercapacitors $11_1$ to $11_5$.

According to the invention, the outputs $d_{vn}$ of each detector unit $14_n$ are combined to generate a voltage detector logic function 21 whose output signal $d_v$ is sent to the charger 15.

Similarly, the outputs $di_n$ of each detector unit $14_n$ are combined to generate a current detector logic function 22 whose output signal $d_i$ is sent to the charger 15.

The operation of the bypass circuit 12 (or $12_1$ to $12_5$) according to the invention is described next with reference to FIGS. 1 and 3.

A first embodiment of the invention monitors the voltage at the terminals of a supercapacitor 11 and, in the event of an overload, bypasses some or all of the charging current $I_c$ of the supercapacitor 11 associated with the bypass circuit 12.

Accordingly, for a single supercapacitor (see FIG. 1), the invention monitors the voltage at the terminals of the supercapacitor, and for a supercapacitor module (see FIG. 2), the invention monitors and balances the voltages at the terminals of the supercapacitors.

The bypass circuit 12 includes a power amplifier, for example a MOSFET, whose current is controlled to generate a continuous characteristic curve like that shown in FIG. 3, where the curve 30 represents the current $i_d$ flowing in the bypass circuit 12 as a function of the voltage V at the terminals thereof. The curve 30 has three portions:

- a portion $30_1$ in which $i_d$ is a constant $I_{dmin}$ (close to 0) called the minimum bypass current (corresponding to the leakage current of the bypass circuit 12), as a function of V up to a value V=V1 called the threshold voltage,
- a portion $30_2$ in which $i_d$ increases linearly from $I_{dmin}$ to a value $I_{dN}$ called the nominal bypass current, at a value V=V2 called the reference voltage, and
- a portion $30_3$ in which $i_d$ as a function of V is constant and equal to or greater than $I_{dN}$.

In this embodiment, the value V1 corresponds to the end of charging voltage of the supercapacitor, for example 2.2 V, and the voltage V2 is slightly higher, for example 2.25 V. Note that the values of V1 and V2 can be varied at will, as a result of which the bypass circuit 12 can easily be adapted to any supercapacitor to be monitored.

In the first embodiment of the invention, using only the bypass circuit 12, a supercapacitor 11 or a module 10 of supercapacitors $11_1$ to $11_5$ is charged at constant current. The charging current $I_c$ is therefore predetermined, for example 5 A, and the nominal bypass current $I_{dN}$ is set to a value greater than $I_c$.

The curves 41 to 45 in FIG. 4 represent the voltage V at the terminals of each of the supercapacitors $11_1$ to $11_5$ and the curves $40_1$ to $40_5$ represent the bypass current $i_d$ in each of the bypass circuits $12_1$ to $12_5$ as a function of time t. It can be seen in this figure that the supercapacitors $11_1$ to $11_5$ are initially unbalanced, i.e. the voltages at their terminals are not equal, and that at the end of charging the voltages of the supercapacitors $11_1$ to $11_5$ are balanced and in the vicinity of the reference voltage, which in this case is chosen to correspond to the end of charging voltage of the supercapacitors.

Thanks to the invention, the supercapacitor module 20 can therefore be balanced quickly at the end of charging because the bypass current as a function of the voltage has a maximum limit.

In the simple embodiment just described, in which the detector units $14_n$ (and the voltage detector and current detector logic functions 21 and 22) are not used, the maximum charging current is $I_{dN}$ and the charging is effected at constant current in order to prevent any overcharging of the supercapacitors.

In a second embodiment of the invention, which optimizes the charging level and duration, charging is carried out at two current levels, the first of which can be very much higher than the nominal bypass current $I_{dN}$ and the second of which has to be less than or equal to the nominal bypass current $I_{dN}$. In this case the detector units $14_n$ and the voltage detector function 21 (see FIG. 2) are used, and the latter's output $d_v$ corresponds to the AND logic operator applied to the outputs $dv_1$ to $dv_5$ of the detector units $14_1$ to $14_5$; the threshold voltage of the bypass circuits $12_1$ to $12_5$ is equal to the end of charging voltage (for example 2 V) of the supercapacitors $11_1$ to $11_5$ and the nominal bypass current $I_{dN}$ is 10 A, for example.

For simplicity, the operation of the invention in the case of a single supercapacitor, for example the supercapacitor $11_1$, is explained next.

The signal $d_{v1}$ delivered by the detector unit $14_1$ is a hysteresis signal shown in FIG. 5, which shows the output $d_{v1}$ as a function of the voltage at the terminals of the supercapacitor $11_1$. The activated state ($d_v$=1) corresponds to a value of V such that the charger 15 delivers a charging current greater than the nominal bypass current $I_{dN}$ and the deactivated state ($d_v$=0) corresponds to a value of V such that the charger delivers a charging current less than or equal to $I_{dN}$. Thus charging is effected in several phases, shown in FIG. 6, in which the curve 61 represents the voltage at the terminals of the module 20 as a function of time t and the curve 62 represents the charging current of the module 20, also as a function of time t.

Phase 1: $d_v$=1

The voltage of the supercapacitor increases to 2 V, the bypass current is substantially zero, and the charging current is 15 A, i.e. greater than $I_{dN}$.

Phase 2: $d_v$=1

The voltage of the supercapacitor increases from 2 V to 2 V+50 mV, and the bypass current therefore increases from 0 to 10 A because of the characteristics of the bypass circuit $12_1$; the charging current remains at 15 A. Given the hysteresis curve of FIG. 5, $d_v$ therefore changes to 0.

Phase 3: $d_v$=0

The voltage of the supercapacitor falls from 2 V+50 mV to 2 V+25 mV and the bypass current decreases from 10 A to 5 A; the charging current changes to 5 A.

Phase 4: $d_v$=0

The voltage of the supercapacitor is constant and equal to 2 V+25 mV, the bypass current is also constant and equal to 5 A, and the charging current is also constant and equal to 5 A.

Phase 5: $d_v$=0

The voltage of the supercapacitor falls from 2 V+25 mV to 2 V, and the bypass current falls from 5 A to substantially 0.

From a module voltage of 10 V, the charger 15 limits the charging current to maintain the voltage of the module constant.

The charging current is modified by the charger 15, which receives the information $d_v$ from the detector unit $14_1$ (or from the detector function 21 in the case of the module 20) and modifies the charging current accordingly.

Note that the offset between the end of charging voltage of the supercapacitor (2 V) and the value of V corresponding to the change of $d_v$ from 1 to 0 in accordance with the hysteresis shown in FIG. 5 (2.05 V) means that the module can be balanced without reducing the load current if the supercapacitors are slightly imbalanced.

It is clear how the method just described in connection with a supercapacitor applies mutatis mutandis to the supercapacitor module 20. As soon as the voltage of one of the supercapacitors of the module 20 exceeds the threshold voltage, the detector function 21 is used.

Thanks to this charging protocol using the voltage detector unit $14_1$ (or the voltage detector function 21 in the case of the module 20), charging can be carried out at a current greater than $I_{dN}$ and the duration of charging optimized, whilst making the end of charging safe.

However, note that, when using this single detector function, in particular for high charging currents (for which the ohmic voltage drops are high), after detecting an overload and the reaction of the charger 15, the voltage detector function remains in the deactivated state ($d_v=0$), although the bypass current is zero or substantially zero. Using only the voltage detector function therefore yields a safe and fast charging protocol, although the duration of the end of charging period can be further reduced.

In accordance with the invention, in this case, to optimize the end of charging dynamics, the current detector function, delivering a signal $d_i$, is used. Its operation is described next in the context of a third embodiment of the invention. The signal $d_i$ corresponds to applying the AND logic operator to the outputs $d_{i1}$ to $d_{i5}$ of the detector units $14_1$ to $14_5$; the threshold voltage of the bypass circuits $12_1$ to $12_5$ is equal to the end of charging voltage of the supercapacitors $11_1$ to $11_5$ (for example 2.4 V) and the nominal bypass current $I_{dN}$ is 10 A, for example.

Again with the aim of simplification, the operation of the invention in the case of a single supercapacitor, for example the supercapacitor $11_1$, is explained next.

The signal $d_{i1}$ delivered by the current detector unit $14_1$ is a hysteresis signal shown in FIG. 7, which shows the output $d_{i1}$, as a function of the bypass current $i_d$.

The activated state ($d_i=1$) corresponds to a value of V such that the charger 15 delivers a constant charging current which can be very much higher than the nominal bypass current $I_{dN}$, and the deactivated state ($d_i=0$) corresponds to a value of V such that the charger 15 delivers a charging current that decreases continuously as a function of time. Thus the charging is effected in a plurality of phases shown in FIG. 8, in which the curve 81 represents the voltage at the terminals of the module 20 as a function of time t and the curve 82 represents the charging current of the module 20, also as a function of time t.

Operation is as follows, where $I_{Cmax}$ is the maximum charging current, $I_{Cmin}$ the minimum charging current, less than $I_{dN}$, and di/dt is the charging current slope.

If $d_v=1$, $I_c=I_{Cmax}$.

If $d_v=0$ and if $d_i=1$, the charging current remains constant.

If $d_v=0$ and if $d_i=0$, $I_C=I_C-(di/dt) \times t$.

As soon as $I_C$ is less than $I_{Cmin}$, the charging current remains constant.

Accordingly, if $d_v$ is in the deactivated state, the charging current is made to decrease in a linear fashion, subject to the limitation set by its minimum value, with a zero slope if $d_i$ is in the activated state and a non-zero slope otherwise.

If $d_v$ is in the activated state, the charging current is reinitialized to its maximum value.

Thanks to this current detector function, a sophisticated charging protocol is obtained wherein, at the end of charging, some bypass current is maintained, which partly overcomes the measurement error associated with the existence of the ohmic component associated with the series resistance of the supercapacitor and proportional to the charging current. The information provided by the overvoltage detector signal $d_v$ is therefore more pessimistic than the real life situation, which is prejudicial to the speed of charging. The charging of the supercapacitor or the module is therefore accelerated compared to the embodiment using charging with only two levels of current.

Of course, the embodiments that have just been described are provided by way of illustrative example only.

In particular, the third embodiment (current detector function combined with voltage detector function) is described in connection with the second embodiment (voltage detector function only), but it is obvious that the current detector function can be used alone, without the voltage detector function, and in combination with the bypass circuit according to the invention.

All the above numerical examples are merely to illustrate the method according to the invention, and the values specified therein have no limiting effect on the invention.

All embodiments of the invention apply equally well to monitoring the charging of a single supercapacitor and to balancing a module comprising several supercapacitors.

The preceding description considers the example of a linear increase in the bypass current as a function of the voltage at the terminals of the supercapacitor, but it goes without saying that the invention can be implemented more generally with the bypass current increasing continuously as a function of the voltage at the terminals of the supercapacitor, when the difference between the reference voltage and the threshold voltage is less than 200 mV and the ratio between the nominal bypass current and the minimum bypass current is greater than 100.

Finally, any means described can be replaced by equivalent means without departing from the scope of the invention.

What is claimed is:

1. A supercapacitor balancing method including bypassing the current flowing in said supercapacitor from a predetermined threshold voltage at the terminals of said supercapacitor, the bypass current being a function of the voltage at the terminals of said supercapacitor and increasing continuously as a function of said voltage, characterized in that said bypass current increases between said threshold voltage, for which said bypass current constitutes a minimum bypass current, and a reference voltage, for which said bypass current constitutes a nominal bypass current, and in that the difference between said reference voltage and said threshold voltage is less than 200 mV and the ratio between said nominal bypass current and said minimum bypass current is greater than 100.

2. A method according to claim 1 wherein said bypass current increases as a linear function of said voltage at the terminals of said supercapacitor.

3. A method according to claim 1 wherein the bypass current is limited as a function of the voltage at the terminals of the supercapacitor.

4. A method according to claim 1 wherein said reference voltage is equal to the end of charging voltage of said supercapacitor.

5. A method according to claim 1 wherein said threshold voltage is equal to the end of charging voltage of said supercapacitor.

6. A method according to claim 1, further including monitoring of the charging current of said supercapacitor as a function of the voltage at the terminals of the supercapacitor by a voltage detector logic function adapted to change from an activated state to a deactivated state if the voltage at the terminals of said supercapacitor exceeds said reference voltage, with the result that the supercapacitor charging current is then reduced, and then to return to the activated state if the voltage at the terminals of said supercapacitor falls below a minimum monitoring voltage.

7. A method according to claim 6, wherein the signal delivered by said voltage detector function is a hysteresis signal.

8. A method according to claim 1, further including monitoring of the charging current of said supercapacitor as a function of the bypass current by a current detector logic function adapted to change from an activated state to a deactivated state if the bypass current is greater than said nominal bypass current, with the result that the charging current of said supercapacitor is then reduced, and then to return to the activated state if the bypass current falls below a minimum monitoring current.

9. A method according to claim 8 wherein the signal delivered by said current detector function is a hysteresis signal.

10. A system for implementing the method according to claim 1, including at least one supercapacitor (11) whose terminals are connected in parallel with a bypass circuit (12) including a current control power amplifier including a MOSFET, a bipolar transistor or an IGBT.

11. A system according to claim 10, wherein a detector unit (14) delivering at least one hysteresis signal representing the voltage at the terminals of said supercapacitor ($d_v$) and/or the bypass current (d) [sic] is connected to said bypass circuit (12) and supplies said signal ($d_v$, $d_i$) to charging means (15) for charging said supercapacitor.

12. A system according to claim 10 including a plurality of supercapacitors ($11_1, \ldots, 11_5$) connected in series and a respective bypass circuit ($12_1, \ldots, 12_5$) connected in parallel with the terminals of each of said supercapacitors ($11_1, \ldots, 11_5$).

13. A system according to claim 10, wherein the signals ($dv_1, \ldots, dv_5, di_1, \ldots, di_5$) delivered by all of said detector units ($12_1, \ldots, 12_5$) are combined by an AND logic function whose output is sent to said charging means (15).

14. A system according to claim 10 including a plurality of supercapacitors connected in series and a single bypass circuit connected in parallel with the terminals of the set of said supercapacitors.

15. A system according to claim 10, including a plurality of supercapacitors connected in parallel and a single bypass circuit connected in parallel with the terminals of the set of said supercapacitors.

* * * * *